US011302332B2

(12) United States Patent
Jang et al.

(10) Patent No.: US 11,302,332 B2
(45) Date of Patent: Apr. 12, 2022

(54) METHOD, COMPUTER DEVICE AND COMPUTER READABLE RECORDING MEDIUM FOR PROVIDING NATURAL LANGUAGE CONVERSATION BY TIMELY PROVIDING SUBSTANTIAL REPLY

(71) Applicant: DEEPBRAIN AI INC., Seoul (KR)

(72) Inventors: Seyoung Jang, Gyeonggi-do (KR); Dosang Yoon, Gyeonggi-do (KR); Jaeho Seol, Seoul (KR)

(73) Assignee: DEEPBRAIN AI INC., Seoul (KR)

( * ) Notice: Subject to any disclaimer, the term of this patent is extended or adjusted under 35 U.S.C. 154(b) by 47 days.

(21) Appl. No.: 16/761,435

(22) PCT Filed: Oct. 30, 2018

(86) PCT No.: PCT/KR2018/012984
§ 371 (c)(1),
(2) Date: May 4, 2020

(87) PCT Pub. No.: WO2019/088638
PCT Pub. Date: May 9, 2019

(65) Prior Publication Data
US 2020/0395019 A1 Dec. 17, 2020

(30) Foreign Application Priority Data
Nov. 3, 2017 (KR) .................. 10-2017-0145690

(51) Int. Cl.
*G10L 15/22* (2006.01)
*G10L 15/26* (2006.01)
(Continued)

(52) U.S. Cl.
CPC ............ *G10L 15/26* (2013.01); *G06F 40/274* (2020.01); *G06F 40/289* (2020.01); *G06N 3/08* (2013.01); *G10L 15/22* (2013.01); *H04L 51/02* (2013.01)

(58) Field of Classification Search
CPC ...................................... G10L 15/22
See application file for complete search history.

(56) References Cited

U.S. PATENT DOCUMENTS

2005/0165607 A1 * 7/2005 Di Fabbrizio .......... G06F 40/30
704/256
2011/0078105 A1 3/2011 Wallace
(Continued)

FOREIGN PATENT DOCUMENTS

JP 2005-196134 A 7/2005
JP 2010-152119 A 7/2010
(Continued)

OTHER PUBLICATIONS

International Search Report for PCT/KR2018/012984 dated Jan. 30, 2019.

*Primary Examiner* — Jialong He
(74) *Attorney, Agent, or Firm* — The PL Law Group, PLLC

(57) ABSTRACT

A method for providing a natural language conversation, which is implemented by an interactive agent system, may include receiving a natural language input, determining a user intent based on the natural language input, and providing a natural language response corresponding to the natural language input, based on the natural language input and/or the determined user intent, which is associated with execution of a specific task, provision of specific information, and/or a simple statement. The provision of the natural language response includes determining whether a first condition is satisfied based on whether it is possible to obtain
(Continued)

all sufficient information from the natural language input, without having to request additional information, and when the first condition is satisfied, determining whether a second condition is satisfied and providing a natural language response belonging to a category of substantial replies when the second condition is satisfied.

10 Claims, 5 Drawing Sheets

(51) Int. Cl.
    *G06F 40/289*     (2020.01)
    *G06F 40/274*     (2020.01)
    *G06N 3/08*     (2006.01)
    *H04L 51/02*     (2022.01)

(56) References Cited

U.S. PATENT DOCUMENTS

| | | | | |
|---|---|---|---|---|
| 2012/0265528 | A1* | 10/2012 | Gruber | G10L 15/183 704/235 |
| 2013/0110519 | A1* | 5/2013 | Cheyer | G06F 16/9537 704/275 |
| 2014/0310001 | A1* | 10/2014 | Kains | G10L 15/32 704/270.1 |
| 2014/0310005 | A1* | 10/2014 | Brown | G06F 40/232 704/275 |
| 2015/0149182 | A1* | 5/2015 | Kains | G10L 15/18 704/275 |
| 2015/0340033 | A1* | 11/2015 | Di Fabbrizio | G10L 15/22 704/254 |
| 2016/0104484 | A1* | 4/2016 | Chakladar | G06F 40/289 704/235 |
| 2016/0132291 | A1* | 5/2016 | Bai | G06F 9/453 715/728 |
| 2016/0163314 | A1* | 6/2016 | Fujii | G10L 13/027 704/275 |
| 2017/0053646 | A1* | 2/2017 | Watanabe | G06N 3/0445 |
| 2018/0233139 | A1* | 8/2018 | Finkelstein | G06F 3/0304 |
| 2018/0314689 | A1* | 11/2018 | Wang | G10L 15/07 |

FOREIGN PATENT DOCUMENTS

| | | |
|---|---|---|
| KR | 10-2006-0064533 A | 6/2006 |
| KR | 10-2007-0058953 A | 6/2007 |
| KR | 10-2011-0070000 A | 6/2011 |

* cited by examiner

METHOD, COMPUTER DEVICE AND COMPUTER READABLE RECORDING MEDIUM FOR PROVIDING NATURAL LANGUAGE CONVERSATION BY TIMELY PROVIDING SUBSTANTIAL REPLY

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2018/012984, filed Oct. 30, 2018, which claims priority to the benefit of Korean Patent Application No. 10-2017-0145690 filed in the Korean Intellectual Property Office on Nov. 3, 2017, the entire contents of which are incorporated herein by reference.

TECHNICAL FIELD

The present invention relates to an interactive agent system, and more particularly, to an interactive agent system capable of providing emotional and natural interaction in a form more similar to conversation between people.

BACKGROUND ART

In recent years, with the development of technology in the field of artificial intelligence, especially in the field of natural language understanding, an interactive agent system that allows a user to manipulate a machine in a more human-friendly way, with interaction via natural language in the form of, for example, voice and/or text, without being limited to manipulating the machine by the conventional machine-oriented command input/output method, and to acquire a desired service from the machine has been increasingly developed and utilized. Accordingly, in a variety of fields, including (but not limited to) online consulting centers, online shopping malls, and the like, users can be provided with desired services through an interactive agent system that provides natural language interactions in the form of voice and/or text.

As the interactive agent systems are used in more and more fields, there is an increasing demand for interactive agent systems that can even provide emotional and natural interaction in a form similar to the conversation between real people without being limited to simply interpreting user's intent and providing a result that matches the user's intent. In addition, with the advent of the Internet of Things and thus the increasing need for human-machine interactive interactions, the demand for an interactive agent system capable of providing emotional and natural conversation is increasing.

SUMMARY

An interactive agent system, in exchanging natural language conversation with a user, usually provides one substantial reply instantly each time the user inputs one sentence. However, when one sentence is input from the user, the sentence does not yet contain information enough to provide a substantial reply, so if a reply is provided at that moment, the reply may rather ruin natural conversation. In addition, in a conversation between real people, a person may decide whether an appropriate point in time at which a substantial reply is expected during the conversation is reached or not and often wait silently for the other person to speak one or several sentences in succession, or utter a simple interjection to let the other person know that the person is listening, until the appropriate point in time is reached, rather than sticking to offering one substantial reply to one sentence input as in an interactive agent system.

Therefore, a response method of the interactive agent system, which attempts to immediately provide a single substantial reply to each sentence input from the current user, is unnatural in light of the conversation between real people.

According to one aspect of the present invention, there is provided a method for providing a natural language conversation, which is implemented by an interactive agent system. The method according to the present invention includes receiving a natural language input; determining a user intent based on the natural language input by processing the natural language input; and providing a natural language response corresponding to the natural language input, based on at least one of the natural language input and the determined user intent. The determined user intent is associated with at least one of execution of a specific task, provision of specific information, and a simple statement. The providing the natural language response includes: determining whether a predetermined first condition is satisfied, wherein whether or not the first condition is satisfied is determined based on whether it is possible to obtain all sufficient information from the natural language input for the execution of the specific task, the provision of the specific information, or the simple statement that is associated with the determined user intent, without having to request additional information; and, when the first condition is satisfied, determining whether a predetermined second condition is satisfied and providing a natural language response belonging to a category of substantial replies when the second condition is satisfied.

According to one embodiment of the present invention, whether or not the second condition is satisfied may be determined based on at least one of whether the determined user intent is associated with execution of a specific task or provision of specific information, what type of sentence is in the natural language input, whether the natural language input is based on a record of previous conversation, and whether the natural language input contains a predetermined common-use phrase.

According to one embodiment of the present invention, whether or not the second condition is satisfied may be determined by determining, based on neural network learning, whether the natural language input is intended to finish a conversation.

According to one embodiment of the present invention, when the determined user intent is associated with the execution of the specific task or the provision of the specific information, it may be determined that the second condition is satisfied, and the method may include when the second condition is satisfied, completing the execution of the specific task or search for the specific information, and then providing a natural language response belonging to the category of the substantial replies, wherein the natural language response notifies of the completion of the execution of the specific task or include at least part of the specific information.

According to one embodiment of the present invention, when the type of the sentence in the natural language input is an interrogative sentence or an imperative sentence, it may be determined that the second condition is satisfied.

According to one embodiment of the present invention, when the natural language input is based on a record of previous conversation, it may be determined that the second condition is satisfied, and the method may include when the second condition is satisfied, providing a natural language response that is generated based on the record of previous conversation and belongs to the category of the substantial replies.

According to one embodiment of the present invention, when the natural language input contains a predetermined common-use phrase, it may be determined that the second condition is satisfied, and the method may include when the second condition is satisfied, providing a natural language response that is predetermined corresponding to the predetermined common-use phrase and belongs to the category of the substantial replies.

According to one embodiment of the present invention, the method may further include when the natural language input does not satisfy the first condition, waiting for additional information to be input for a predetermined period of time without providing a natural language response, and providing a natural language response for requesting the additional information when the additional information is not input until the predetermined period of time has elapsed.

According to one embodiment of the present invention, the method may further include when the natural language input does not satisfy the second condition, waiting for additional information to be input for a predetermined period of time without providing a natural language response, and providing a natural language response for requesting the additional information when the additional information is not input until the predetermined period of time has elapsed.

According to another aspect of the present invention, there is provided a computer-readable recording medium having one or more instructions stored thereon which, when executed by a computer, cause the computer to perform one of the methods described above.

According to still another aspect of the present invention, there is provided a computer device configured to provide a natural language conversation, the computer device including a user input receiving module configured to receive a natural language input; an input interpretation module configured to determine a user input based on the natural language input by processing the natural language input; and a response providing module configured to provide a natural language response corresponding to the natural language input, based on at least one of the natural language input and the determined user intent. The determined user intent is associated with at least one of execution of a specific task, provision of specific information, and a simple statement. The response providing module is further configured to determine whether a predetermined first condition is satisfied, wherein whether or not the first condition is satisfied is determined based on whether it is possible to obtain all sufficient information from the natural language input for the execution of the specific task, the provision of the specific information, or the simple statement that is associated with the determined user intent, without having to request additional information, and, when the first condition is satisfied, determine whether a predetermined second condition is satisfied, and provide a natural language response belonging to a category of substantial replies when the second condition is satisfied.

According to one embodiment of the present invention, the computer device may include a user terminal or a server communicably coupled to the user terminal.

It is possible to provide an interactive agent system capable of providing emotional and natural interaction in a form similar to a conversation between people.

DETAILED DESCRIPTION

Figure 1:
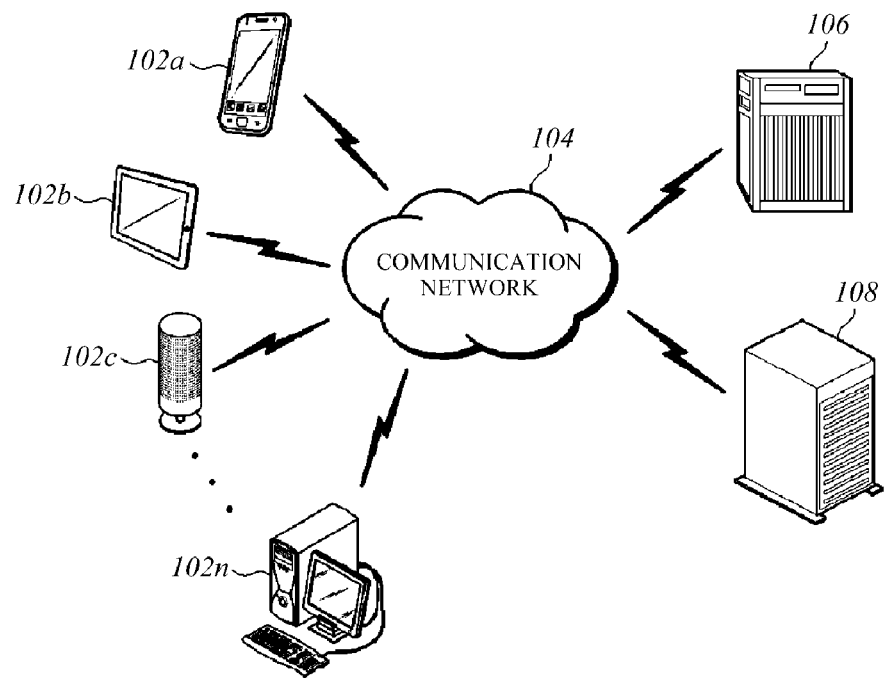
FIG. 1 is a diagram schematically illustrating a system environment in which an interactive agent system can be implemented according to one embodiment of the present invention.

Hereinafter, detailed embodiments of the present invention will be described with reference to the accompanying drawings. Detailed descriptions of related well-known functions and configurations that are determined to unnecessarily obscure the gist of the present invention will be omitted. Further, the following descriptions are provided for explaining the exemplary embodiment of the present invention, and the present invention should not be construed as being limited thereto.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein the term "and/or" includes any and all combinations of one or more of the associated listed items. The terms "comprises," "includes," and "has" specify the presence of stated features, numbers, steps, operations, elements, components, and/or combinations thereof, but do not preclude the presence or addition of one or more other features, numbers, steps, operations, elements, components and/or combinations thereof.

In the following embodiments, the term, such as "module" or " . . . unit," indicates a unit for processing at least one function or operation, and this may be implemented by hardware, software, or a combination thereof. In addition, a plurality of "modules" or " . . . units" may be integrated as at least one module and implemented as at least one processor except for a "module" or " . . . unit" needed to be implemented as specific hardware.

In embodiments of the present invention, the term "interactive agent system" may refer to an arbitrary information processing system that is capable of receiving a natural language input (e.g., a command, a statement, a request, a question, or the like in natural language from a user) from a user through interactive interactions with the user via natural language in the form of voice and/or text, interpreting the received natural language input to identify an intent of the user, and performing necessary operations based on the found intent of the user, that is, providing an appropriate conversation response and/or performing a task, and the interactive agent system is not limited to a specific form. In embodiments of the present invention, the operations performed by the interactive agent system may include, for example, provision of a conversation response. In embodiments of the present invention, the operations performed by the interactive agent system may further include, for example, execution of a task. In embodiments of the present invention, it should be understood that the conversation response provided by the interactive agent system may be provided in various forms, such as visual, auditory, and/or tactile forms (including, but not limited to, for example, voice, sound, text, video, images, symbols, emoticons, hyperlinks, animation, various notifications, motion, haptic feedback, and the like). In embodiments of the present invention, the task performed by the interactive agent system may include various types of tasks including (but not limited to), for example, information search, commodity purchase, message creation, email creation, phone call, music playback, photographing, user location search, map/navigation service, and the like.

In embodiments of the present invention, the conversation response provided by the interactive agent system may be a "substantial reply". In embodiments of the present invention, the "substantial reply" provided by the interactive agent system may be a reply with substantial content that notifies of completion of executing a task that matches the user intent (e.g., "the requested task has been completed," etc.), provides new content obtained based on the user's input to indicate that the user's intent has been understood, or includes at least part of meaningful information that matches the user's intent. In embodiments of the present invention, the conversation response provided by the interactive agent system may be a "request for additional information". In embodiments of the present invention, the conversation response provided by the interactive agent system may be a simple interjection, not the "substantial reply" including the meaningful information or the "request for additional information". In embodiments of the present invention, the "interjection" provided by the interactive agent system may include a simple response/answer expression for holding a more natural and smooth conversation (e.g., an expression, such as "yes," "yup," "OK," "sure," or the like, which simply indicates that the listener is listening to the other person, without conveying meaningful information), other exclamations, various sounds and images, symbols, emoticons, and the like.

In the embodiment of the present invention, the interactive agent system may include a chatbot system based on a messenger platform, for example, a chatbot system that exchanges messages with a user on a messenger and provides various types of information desired by the user or performs a task, but it should be understood that the present invention is not limited thereto.

In addition, unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be described in detail with reference to the accompanying drawings.

FIG. 1 is a diagram schematically illustrating a system environment in which an interactive agent system can be implemented according to one embodiment of the present invention. As illustrated, the system environment 100 includes a plurality of user terminals 102a to 102n, a communication network 104, an interactive agent server 106, and an external service server 108.

According to one embodiment of the present invention, each of the plurality of user terminals 102a to 102n may be an arbitrary user electronic device having a wired or wireless communication function. Each of the user terminals 102a to 102n may be a variety of wired or wireless communication terminals including, for example, a smartphone, a tablet personal computer (PC), a music player, a smart speaker, a desktop computer, a laptop computer, a personal digital assistant (PDA), a game console, a digital TV, a set-top box, and the like, but is not limited to a specific type. According to one embodiment of the present invention, each of the user terminals 102a to 102n may communicate with (i.e., transmit and receive necessary information to and from) the interactive agent server 106 through the communication network 104.

According to one embodiment of the present invention, each of the user terminals 102a to 102n may communicate with (i.e., transmit and receive necessary information to and from) the external service server 108 through the communication network 104. According to one embodiment of the present invention, each of the user terminals 102a to 102n may receive a user input in the form of voice and/or text from the outside and provide an operation result (for example, provision of a specific conversation response and/or execution of a specific task, etc.) corresponding to the user input, which is acquired through communication with the interactive agent server 106 and/or the external service server 108 via the communication network 104 (and/or through processing in each user terminal 102a to 102n), to the user.

In the embodiment of the present invention, the execution of a task, as an operation corresponding to the user input, may include execution of various types of tasks including (but not limited to), for example, information search, commodity purchase, message creation, email creation, phone call, music playback, photographing, user location search, map/navigation service, and the like. According to one embodiment of the present invention, a conversation response, as an operation result corresponding to the user input, which is provided by the user terminals 102a to 102n, may be a substantial reply that notifies of, for example, completion of executing a task that matches the user's intent (e.g., "the requested task has been completed", and the like), provides new content acquired based on the user's intent to indicate that the user's intent has been understood, or includes meaningful information (e.g., substantial data content and the like) that matches the user's intent. According to one embodiment of the present invention, the conversation response provided by each of the user terminals 102a to 102n corresponding to the user input may be a follow-up question to clearly identify the above-described user's intent or a request for additional information. According to one embodiment of the present invention, it should be understood that the conversation response corresponding to the user input, which is provided by each of the user terminals 102a to 102n, may not be the substantial reply or the request for additional information described above, but may be a simple interjection, such as a simple response/answer expression for holding a more natural and smooth conversation (e.g., an expression, such as "yes," "yup," "OK,"

"sure," or the like, which simply indicates that the listener is listening to the other person, without conveying meaningful information), other exclamations, various sounds and images, symbols, emoticons, and the like. According to one embodiment of the present invention, each of the user terminals 102a to 102n may provide the conversation response, as an operation result corresponding to the user input, to the user in various forms, such as visual, auditory, and/or tactile forms (including, but not limited to, for example, voice, sound, text, video, images, symbols, emoticons, hyperlinks, animation, various notifications, motion, haptic feedback, and the like).

According to one embodiment of the present invention, the communication network 104 may include an arbitrary wired or wireless communication network, for example, a transmission control protocol (TCP)/Internet protocol (IP) communication network. According to one embodiment of the present invention, the communication network 104 may include, for example, a Wi-Fi network, a local area network (LAN), an Internet network, and the like, and the present invention is not limited thereto. According to one embodiment of the present invention, the communication network 104 may be implemented using, for example, Ethernet, Global System for Mobile Communications (GSM), enhanced data GSM environment (EDGE), Code-Division Multiple Access (CDMA), Time-Division Multiple Access (TDMA), Bluetooth, VoIP, Wi-MAX, Wibro, and any other various wired or wireless communication protocols.

According to one embodiment of the present invention, the interactive agent server 106 may communicate with the user terminals 102a to 102n via the communication network 104. According to one embodiment of the present invention, the interactive agent server 106 may be operable to transmit and receive necessary information to and from the user terminals 102a to 102n via the communication network 104, and, based on this, provide the user with an operation result corresponding to the user input received at the user terminals 102a to 102n, that is, an operation result matching with the user intent. According to one embodiment of the present invention, the interactive agent server 106 may receive a user natural language input in the form of voice and/or text from the user terminals 102a to 102n through, for example, the communication network 104, and process the received natural language input based on prepared models to determine the user's intent. According to one embodiment of the present invention, the interactive agent server 106 may cause a corresponding operation to be performed based on the determined user's intent. According to one embodiment of the present invention, the interactive agent server 106 may generate and transmit, for example, a specific control signal to a corresponding user terminal 102a to 102n so that the corresponding user terminal 102a to 102n performs a specific task that matches the user intent. According to one embodiment of the present invention, the interactive agent server 106 may access the external service server 108 via the communication network 104 so that the user terminals 102a to 102n perform, for example, a specific task that matches the user intent.

According to one embodiment of the present invention, the interactive agent server 106 may generate, for example, a specific conversation response that matches the user's intent, and transmit the generated conversation response to the user terminals 102a to 102n. According to one embodiment of the present invention, the interactive agent server 106 may generate a corresponding conversation response in the form of voice and/or text based on the determined user intent, and transmit the generated response to the user terminals 102a to 102n via the communication network 104. According to one embodiment of the present invention, the conversation response generated by the interactive agent server 106 may include other visual elements, such as images, videos, symbols, emoticons, and the like, other auditory elements, such as sound, or other tactile elements, along with a natural language response in the form of voice and/or text described above. According to one embodiment of the present invention, the conversation response based on the user intent, which is transmitted from the interactive agent server 106 to the user, may be a substantial reply that notifies of, for example, completion of executing a task that matches the user's intent (e.g., "the requested task has been completed," etc.), provides new content obtained based on the user's input (e.g., provides content inferred from previous conversation content) to indicate that the user's intent has been understood, or includes meaningful information (e.g., substantial data content and the like) that matches to the user's intent. According to one embodiment of the present invention, the conversation response based on the user intent, which is transmitted from the interactive agent server 106 to the user terminals 102a to 102n, may be, for example, the above-described follow-up question for clearly identifying the user's intent or the request for additional information. According to one embodiment of the present invention, the conversation response based on the user intent, which is transmitted from the interactive agent server 106 to the user terminals 102a to 102n, may not be the above-described substantial reply or the request for additional information, but may be a simple interjection, such as a simple response/answer expression for holding a more natural and smooth conversation (e.g., an expression, such as "yes," "yup," "OK," "sure," or the like, which simply indicates that the listener is listening to the other person, without conveying meaningful information), other exclamations, various sounds and images, symbols, emoticons, and the like. According to one embodiment of the present invention, depending on the type of user input (e.g., voice input or text input) received at the user terminals 102a to 102n, responses of the same form may be generated on the interactive agent server 106 (e.g., a voice response is generated when a voice input is given and a text response is generated when a text input is given), but the present invention is not limited thereto. It should be noted that according to another embodiment of the present invention, a response in the form of voice and/or text may be generated and provided regardless of the type of user input.

According to one embodiment of the present invention, the interactive agent server 106 may communicate with the external service server 108 via the communication network 104, as described above. The external service server 108 may be, for example, a messaging service server, an online consulting center server, an online shopping mall server, an information search server, a map service server, a navigation service server, or the like, and the present disclosure is not limited thereto. According to one embodiment of the present invention, the conversation response based on the user intent, which is transmitted from the interactive agent server 106 to the user terminals 102a to 102n, may include data content which is retrieved and acquired from, for example, the external service server 108.

In the drawing, the interactive agent server 106 is illustrated as a separate physical server configured to be capable of communicating with the external service server 108 via the communication network 104, but the present disclosure is not limited thereto. It should be noted that according to another embodiment of the present invention, the interactive agent server 106 may be configured to be included as part of various service servers, such as an online consulting center server, an online shopping mall server, and the like.

Figure 2:
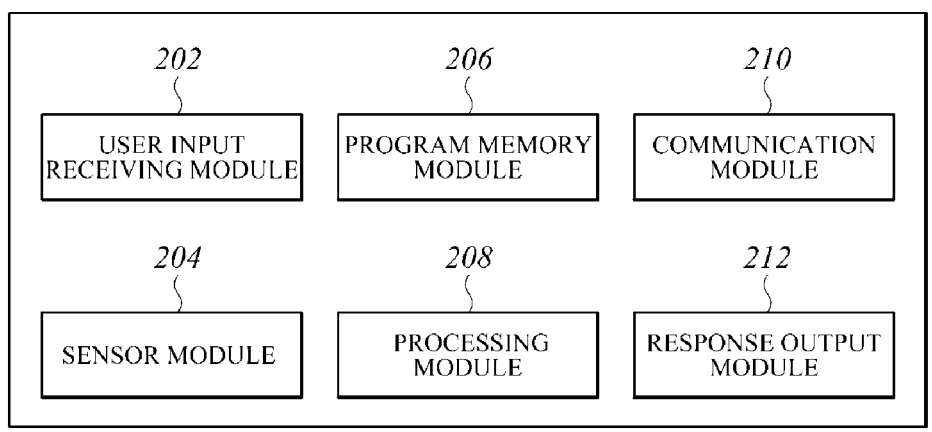
FIG. 2 is a functional block diagram schematically illustrating a functional configuration of a user terminal (102) of FIG. 1 according to one embodiment of the present invention.

FIG. 2 is a block diagram schematically illustrating a functional configuration of the user terminal 102 illustrated in FIG. 1, according to one embodiment of the present invention. As illustrated, the user terminal 102 includes a user input receiving module 202, a sensor module 204, a program memory module 206, a processing module 208, a communication module 210, and a response output module 212.

According to one embodiment of the present invention, the user input receiving module 202 may receive various forms of input, for example, a natural language input, such as a voice input and/or a text input (and additionally other forms of input, such as a touch input), from a user. According to one embodiment of the present invention, the user input receiving module 202 may include, for example, a microphone and an audio circuit, acquire a user voice input signal through the microphone, and convert the acquired signal into audio data. According to one embodiment of the present invention, the user input receiving module 202 may include various forms of input devices, for example, various pointing devices, such as a mouse, a joystick, a trackball, and the like, a keyboard, a touch screen, a stylus, and the like, and acquire a text input and/or a touch input signal, which is received from the user through the input devices. According to one embodiment of the present invention, the user input received at the user input receiving module 202 may be associated with execution of a predetermined task, for example, execution of a predetermined application or search for predetermined information, but the present invention is not limited thereto. According to another embodiment of the present invention, the user input received by the user input receiving module 202 may require only a simple conversation response regardless of execution of a predetermined application or information search. According to another embodiment, the user input received by the user input receiving module 202 may be related to a simple statement for unilateral communication.

According to one embodiment of the present invention, the sensor module 204 may include one or more different types of sensors, and acquire, through these sensors, status information of the user terminal 102, for example, a physical status of the corresponding user terminal 102, software and/or hardware status, or information on an environment status of the user terminal 102. According to one embodiment of the present invention, the sensor module 204 may include, for example, an optical sensor, and detect a change in an ambient light status of the corresponding user terminal 102 through the optical sensor. According to one embodiment of the present invention, the sensor module 204 may include, for example, a movement sensor, and detect, through the movement sensor, whether the corresponding user terminal 102 is moved. According to one embodiment of the present invention, the sensor module 204 may include, for example, a speed sensor and a global positioning system (GPS) sensor, and detect a location and/or an orientation state of the corresponding user terminal 102 through these sensors. It should be noted that according to another embodiment of the present invention, the sensor module 204 may include other various types of sensors, such as a temperature sensor, an image sensor, a pressure sensor, a touch sensor, and the like.

According to one embodiment of the present invention, the program memory module 206 may be an arbitrary storage medium in which various programs executable on the user terminal 102, for example, a variety of application programs and related data, are stored. According to one embodiment of the present invention, in the program memory module 206, various application programs including, for example, a dialing program, an email application, an instant messaging application, a camera application, a music playback application, a video playback application, an image management program, a map application, a browser application, and the like, and data related to execution of these programs may be stored. According to one embodiment of the present invention, the program memory module 206 may be configured to include various types of volatile or non-volatile memory, such as a dynamic random access memory (DRAM), a static random access memory (SRAM), a double data rate random access memory (DDR RAM), a read-only memory (ROM), a magnetic disk, an optical disk, a flash memory, and the like.

According to one embodiment of the present invention, the processing module 208 may communicate with each component module of the user terminal 102 and perform various operations on the user terminal 102. According to one embodiment of the present invention, the processing module 208 may run and execute various application programs on the program memory module 206. According to one embodiment of the present invention, the processing module 208 may receive signals acquired by the user input receiving module 202 and the sensor module 204, if necessary, and perform appropriate processing on these signals. According to one embodiment of the present invention, the processing module 208 may perform appropriate processing on signals received from the outside via the communication module 210, if necessary.

According to one embodiment of the present invention, the communication module 210 may allow the user terminal 102 to communicate with the interactive agent server 106 and/or the external service server 108 via the communication network 104 of FIG. 1. According to one embodiment of the present invention, the communication module 210 may allow, for example, the signals acquired by the user input receiving module 202 and the sensor module 204 to be transmitted to the interactive agent server 106 and/or the external service server 108 via the communication network 104 according to a predetermined protocol. According to one embodiment of the present invention, the communication module 210 may receive various signals, for example, a response signal including a natural language response in the form of voice and/or text, or various control signals, from the interactive agent server 106 and/or the external service server 108 via the communication network 104, and perform appropriate processing according to a predetermined protocol.

According to one embodiment of the present invention, the response output module 212 may output a response in various forms, such as visual, auditory, and/or tactile forms, corresponding to the user input. According to one embodiment of the present invention, the response output module 212 may include various display devices, such as a touch screen based on such technology as liquid crystal display (LCD), light emitting diode (LED), organic light-emitting diode (OLED), quantum dot light-emitting diode (QLED), or the like, and provide the user with visual responses, for example, text, videos, hyperlinks, animation, various notifications, and the like, corresponding to the user input through the display devices. According to one embodiment of the present invention, the response output module 212 may include, for example, a speaker or a headset, and provide the user with an auditory response, for example, a voice and/or sound response, corresponding to the user input through the speaker or the headset. According to one embodiment of the present invention, the response output module 212 may include a motion/haptic feedback generation unit, and provide a tactile response, for example, a motion/haptic feedback, to the user through the motion/haptic feedback unit. According to one embodiment of the present invention, the response output module 212 may simultaneously provide a combination of any two or more of a text response, a voice response, and a motion/haptic feedback corresponding to the user input.

Figure 3:
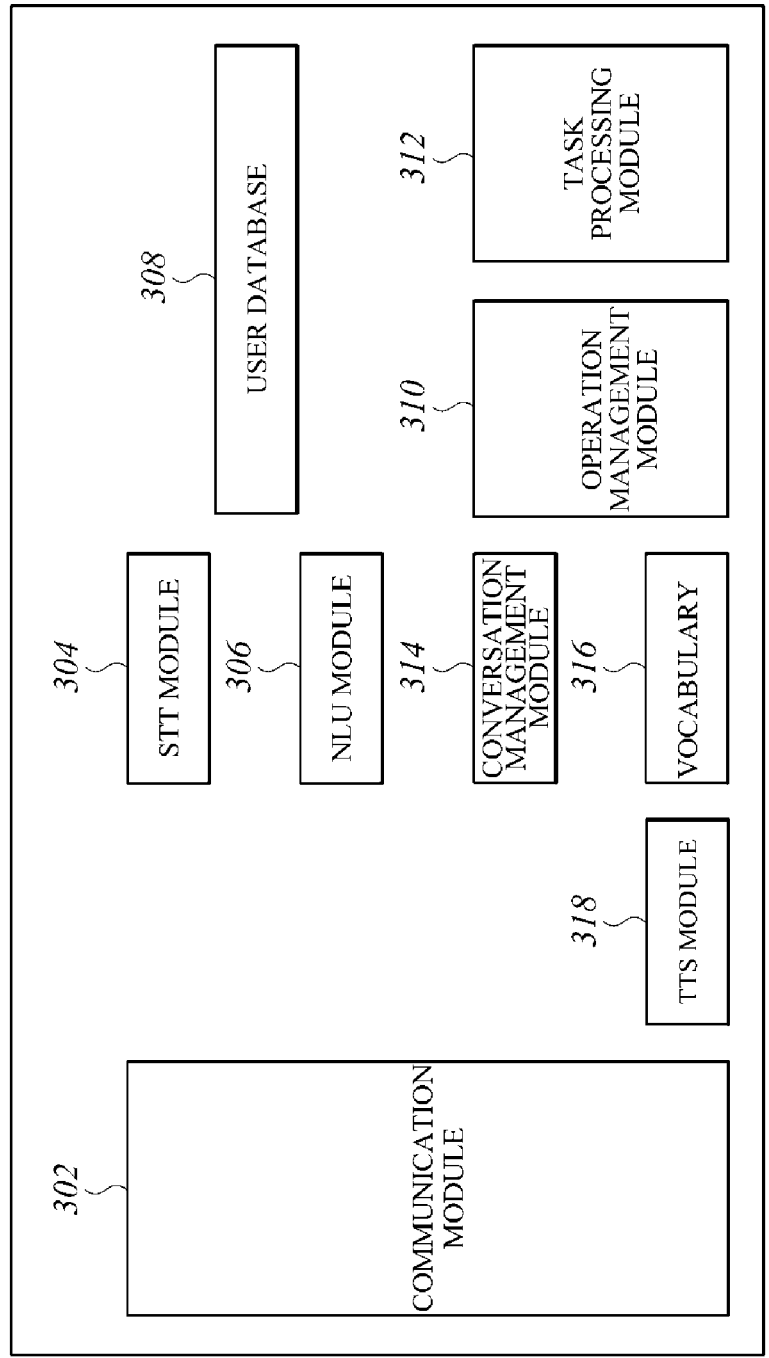
FIG. 3 is a functional block diagram schematically illustrating a functional configuration of an interactive agent server (106) of FIG. 1 according to one embodiment of the present invention.

FIG. 3 is a functional block diagram schematically illustrating a functional configuration of the interactive agent server 106 of FIG. 1, according to one embodiment of the present invention. As illustrated, the interactive agent server 106 includes a communication module 302, a speech-to-text (STT) module, a natural language understanding (NLU) module 306, a user database 308, an operation management module 310, a task processing module 312, a conversation management module 314, a vocabulary 316, and a text-to-speech (TTS) module 318.

According to one embodiment of the present invention, the communication module 302 may allow the interactive agent server 106 to communicate with the user terminal 102 and/or the external service server 108 via the communication network 104 according to a predetermined wired or wireless communication protocol. According to one embodiment of the present invention, the communication module 302 may receive a voice input and/or a text input of the user, which is transmitted from the user terminal 102 via the communication network 104. According to one embodiment of the present invention, the communication module 302 may receive status information of the user terminal 102, transmitted from the user terminal 102 via the communication network 104, along with, or separate from, the voice input and/or the text input from the user, which is transmitted from the user terminal 102. According to one embodiment of the present invention, the status information may include, for example, various types of status information regarding the corresponding user terminal 102 (e.g., a physical status of the user terminal 102, a software/hardware status of the user terminal 102, environment status information of the user terminal 102, and the like) at the time of the voice input and/or text input from the user. According to one embodiment of the present invention, the communication module 302 may also perform an appropriate operation to transmit the conversation response (e.g., a natural language response in the form of voice and/or text, etc.), generated by the interactive agent server 106 in response to the received user input, to the user terminal 102 via the communication network 104.

According to one embodiment of the present invention, the STT module 304 may receive a voice input among the user inputs received through the communication module 302 and convert the received voice input into text data based on pattern matching or the like. According to one embodiment of the present invention, the STT module 304 may extract features from the voice input of the user and generate a feature vector sequence. According to one embodiment of the present invention, the STT module 304 may generate a text recognition result, for example, a word sequence, based on dynamic time warping (DTW) technique or various statistical models, such as hidden Markov model (HMM), Gaussian mixture model (GMM), deep neural network models, n-gram models, and the like. According to one embodiment of the present invention, the STT module 304 may refer to each user characteristic data in the user database 308, which will be described below, when converting the received voice input into text data based on pattern matching.

According to one embodiment of the present invention, the NLU module 306 may receive a text input from the communication module 302 or the STT module 304. According to one embodiment of the present invention, the text input received by the NLU module 306 may be, for example, a user text input, which has been received by the communication module 302 from the user terminal 102 via the communication network 104, or a text recognition result, for example, a word sequence, which has been generated by the STT module 304 from the user voice input received by the communication module 302. According to one embodiment of the present invention, the NLU module 306 may receive, concurrently with or after receiving the text input, status information associated with the corresponding user input, for example, status information of the user terminal 102 at the time of the corresponding user input. As described above, the status information may be, for example, various types of status information related to the corresponding user terminal 102 (e.g., physical status of the user terminal 102, software and/or hardware status, environment status information of the user terminal 102, and the like) at the time of the user voice input and/or the text input to the user terminal 102.

According to one embodiment of the present invention, the NLU module 206 may match the received text input with one or more user intents. Here, the user intent may be associated with a series of operations that can be understood and performed by the interactive agent server 106 according to the user intent. According to one embodiment of the present invention, the NLU module 306 may refer to the above-described status information when matching the received text input with one or more user intents. According to one embodiment of the present invention, the NLU module 306 may refer to each user characteristic data in the user database 308, which will be described below, when matching the received text input with one or more user intents.

According to one embodiment of the present invention, the NLU module 306 may operate based on, for example, a predefined ontology model. According to one embodiment of the present invention, the ontology model may be represented by, for example, a hierarchical structure among nodes, wherein each node may be one of an "intent" node corresponding to the user's intent and a child "attribute" node linked to the "intent" node (a node directly linked to the "intent" node or a child "attribute" node linked to an "attribute" node of the "intent" node). According to one embodiment of the present invention, the "intent" node and "attribute" nodes directly or indirectly linked to the "intent" node may form one domain, and an ontology may be composed of a set of such domains. According to one embodiment of the present invention, the ontology model to be used in the NLU module 306 may be configured to include domains corresponding, respectively, to all intents that, for example, an interactive agent system can understand and perform an action corresponding thereto. It should be noted that according to one embodiment of the present invention, the ontology model may be dynamically changed by adding or deleting a node or modifying a relationship among the nodes.

According to one embodiment of the present invention, an intent node and attribute nodes of each domain in the ontology model may be respectively associated with words and/or phrases related to the corresponding user intent or attributes. According to one embodiment of the present invention, the NLU module 306 may implement the ontology model in the form of, for example, a vocabulary dictionary (not specifically shown) composed of nodes of a hierarchical structure and a set of words and/or phrases associated with each node, and the NLU module 306 may determine a user intent based on the ontology model implemented in the form of a vocabulary dictionary. For example, according to one embodiment of the present invention, the NLU module 306, upon receiving a text input or a word sequence, may determine with which node of which domain in the ontology model each word in the sequence is associated, and determine a corresponding domain, that is, a user intent, based on the determination. According to one embodiment of the present invention, when the user intent is determined, the NLU module 306 may generate a query for an operation according to the determined user intent.

According to one embodiment of the present invention, the user database 308 may be a database that stores and manages user-specific characteristic data. According to one embodiment of the present invention, the user database 308 may include, for example, the record of user's previous conversation, user's pronunciation feature information, user vocabulary preference, user's location, setting language, contact/friend list, and other various types of user characteristic information for each user. According to one embodiment of the present invention, the user database 398 may include user characteristic information obtained from each user's record of previous conversation, including, for example, the frequency of user's use of an interjection, the type of interjection frequently used, the type of interjection or other common-use phrases used according to the mood or emotional status in a conversation, and the like.

According to one embodiment of the present invention, as described above, the STT module 304 may refer to user characteristic data of each user, for example, the user-specific pronunciation features, in the user database 308 when converting the voice input into text data, and thereby acquire more accurate text data. According to one embodiment of the present invention, the NLU module 306, when determining the user intent, may refer to user characteristic data of each user, for example, user-specific characteristics or context, in the user database 308, and thereby determine more accurate user intent. According to one embodiment of the present invention, as described below, the conversation management module 314 may refer to the user characteristic data in the user database 308 when generating a conversation response, for example, generating a substantial reply, selecting an interjection, selecting a question for requesting additional information, and the like.

In the drawing, the user database 308 which stores and manages the user-specific characteristic data is illustrated as being disposed in the interactive agent server 106, but the present invention is not limited thereto. It should be noted that according to another embodiment of the present invention, the user database which stores and manages the use-specific characteristic data may be present in, for example, the user terminal 102, or may be distributively disposed in the user terminal 102 and the interactive agent server 106.

According to one embodiment of the present invention, the operation management module 310 may receive a query generated by the NLU module 306 and generate a flow of a series of operations in response to the received inquiry, according to a predetermined operation management model (not shown). According to one embodiment of the present invention, the operation management module 310 may determine whether the query received from the NLU module 306 contains sufficient information to clearly express the user intent (e.g., whether basic word classes required for constructing a sentence are all contained, whether sufficient information to perform a task or provide a conversation response corresponding to the user intent, without additional information, is contained, or the like). According to one embodiment of the present invention, when it is determined that the inquiry received from the NLU module 306 contains the sufficient information to clearly express the user intent, the operation management module 310 may generate a detailed operation flow for executing a task and/or providing a conversation response or the like corresponding to the query. According to one embodiment of the present invention, when it is determined that the query received from the NLU module 306 does not contain the sufficient information to clearly express the user intent, the operation management module 310 may generate a detailed operation flow of procedures for waiting for an additional user input for a predetermined period of time, requesting additional information, or asking an additional question for obtaining lacking information. According to one embodiment of the present invention, the operation management module 310 may interact with the task processing module 312 and/or the conversation management module 314 for performing the generated operation flow.

According to one embodiment of the present invention, as described above, the task processing module 312 may interact with the operation management module 310 to be notified of the operation flow for executing a predetermined task that satisfies the query. According to one embodiment of the present invention, the task processing module 312 may process the received operation flow so that the task that matches the user intent is completed. According to one embodiment of the present invention, the task processing module 312 may communicate with the user terminal 102 and/or the external service server 108 via the communication module 302 and the communication network 104. According to one embodiment of the present invention, the task processing module 312 may generate, for example, a predetermined control signal for the user terminal 102 and transmit the generated control signal to the user terminal 102 via the communication module 302 and the communication network 104. According to one embodiment of the present invention, the task processing module 312 may access, for example, the external service server 108 and request and receive a necessary service therefrom.

According to one embodiment of the present invention, as described above, the conversation management module 314 may interact with the operation management module 310 to be notified of an operation flow for providing a conversation response to the user. According to one embodiment of the present invention, the conversation management module 314 may be notified of, for example, an operation flow for providing a substantial reply and/or an interjection from the conversation management module 314, and perform necessary procedures according thereto. According to one embodiment of the present invention, the conversation management module 314 may determine, for example, whether a substantial reply that matches the user intent is needed, and, when determined to be needed, perform procedures for generating an appropriate reply and providing the generated substantial reply to the user terminal 102 via the communication module 302 and the communication network 104.

According to one embodiment of the present invention, when it is determined that the substantial reply is not needed, the conversation management module 314 may determine, for example, whether an interjection is needed, and, when determined to be needed, perform procedures for selecting an appropriate interjection and providing the selected interjection to the user terminal 02 via the communication module 302 and the communication network 104. According to one embodiment of the present invention, the conversation management module 314 may be notified of, for example, the operation flow for a request for additional information or an additional question from the operation management module 310 and perform necessary procedures according thereto. According to one embodiment of the present invention, the conversation management module 314 may perform procedures for, for example, selecting an additional question for obtaining necessary information, providing the selected additional question to the user terminal 102 via the communication module 302 and the communication network 104, and receiving an additional user answer in response to the additional question.

According to one embodiment of the present invention, when generating a conversation response, for example, a substantial reply, selecting an interjection, and selecting an additional question, the conversation management module 314 may refer to the user characteristic data (e.g., the record of previous conversation of a user, user's pronunciation feature information, user vocabulary preference, user's location, setting language, contact/friend list, and the frequency of use of an interjection by a user, the type of interjection frequently used, the type of interjection or other common-use phrases used according to the mood or emotional status in a conversation, which are obtained from each user's record of previous conversation) of the user database 308 described above. According to one embodiment of the present invention, the conversation management module 314 may refer to the vocabulary 316 when generating a conversation response, for example, a substantial reply, selecting an interjection, and selecting an additional question. According to one embodiment of the present invention, the vocabulary 316 may be a predetermined lexical database that includes vocabularies, abbreviations, buzzwords, non-standard words, etc. assigned to each persona of the interactive agent system, such as a gender, an age group, a region of origin, and a set personality. According to one embodiment of the present invention, the vocabulary 316 may be continuously updated to reflect trends or issues of the time.

According to one embodiment of the present invention, it should be noted that the above-described series of operations, such as processes of receiving a user input, determining user intent, generating a query that matches the determined user intent, and generating and processing an operation flow in accordance with the query, may be repeatedly/continuously performed several times in order to achieve the ultimate goal of the user.

According to one embodiment of the present invention, the TTS module 318 may receive a conversation response which has been selected to be transmitted to the user terminal 102 by the conversation management module 312. The conversation response received by the TTS module 318 may be natural language or a word sequence in the form of text. According to one embodiment of the present invention, the TSS module 318 may convert the received input in the form of text into a voice form according to various types of algorithms.

In the embodiment of the present invention described with reference to FIGS. 1 to 3, the interactive agent system is described as being implemented based on a client-server model between the user terminal 102 and the interactive agent server 106, in particular, a so-called "thin client-server model," in which a client provides only a user input/output function and any other functions of the interactive agent system are delegated to the server, but the present invention is not limited thereto. It should be noted that according to another embodiment of the present invention, the interactive agent system may be implemented by distributing functions thereof between the user terminal and the server, or alternatively, the functions may be implemented as independent applications installed on the user terminal. In addition, it should be noted that according to one embodiment of the present invention, when the interactive agent system is implemented by distributing functions thereof between the user terminal and the server, the distribution of each function of the interactive agent system between the client and the server may be implemented differently for each embodiment. Also, in the embodiment of the present invention described above with reference to FIGS. 1 to 3, for convenience of description, specific modules have been described as performing predetermined operations, but the present invention is not limited thereto. It should be noted that according to another embodiment of the present invention, the operations described as being performed by any specific module may be respectively performed by other separate modules different from the specific module.

Figure 4:
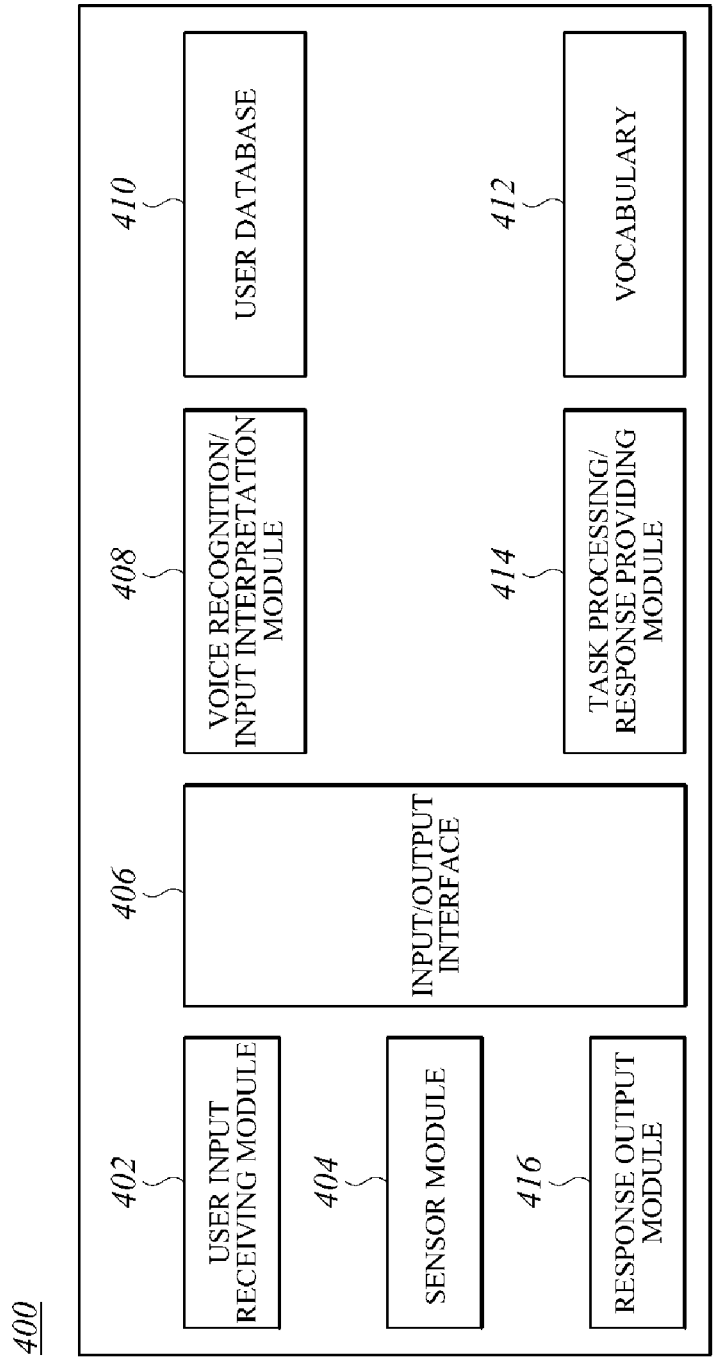
FIG. 4 is a functional block diagram schematically illustrating a functional configuration of an interactive agent system according to one embodiment of the present invention.

FIG. 4 is a functional block diagram schematically illustrating a functional configuration of an interactive agent system 400 according to one embodiment of the present invention. As described above, functions of the interactive agent system may be implemented by being distributed between a client and a server, for example, between the user terminal 102 and the interactive agent server 106 illustrated in FIG. 1, and it should be noted that the present drawing schematically illustrates the configuration of the interactive agent system from the perspective of functionality, regardless of whether the implementation of each function is performed in the client or in the server. As illustrated, the interactive agent system 400 includes a user input receiving module 402, a sensor module 404, an input/output interface 406, a voice recognition/input interpretation module 408, a user database 410, a vocabulary 412, a task executing/response providing module 414, and a response output module 416.

According to one embodiment of the present invention, the user input receiving module 402 may receive various forms of input from a user, for example, a natural language input, such as voice input and/or text input (additionally, other forms of input, such as touch input and the like). According to one embodiment of the present invention, the user input received by the user input receiving module 402 may be associated with execution of a predetermined task, for example, execution of a predetermined application or information search, but the present invention is not limited thereto. According to another embodiment of the present invention, the user input received by the user input receiving module 402 may require only a simple conversation response regardless of execution of a predetermined application or information search. According to another embodiment of the present invention, the user input received by the user input receiving module 402 may be related to a simple statement unilateral communication.

According to one embodiment of the present invention, the sensor module 404 may acquire status information of a user terminal, for example, a physical status of the corresponding user terminal, software and/or hardware status, information on an environment status of the user terminal, or the like. According to one embodiment of the present invention, the sensor module 40 may include one or more different types of sensors and, through these sensors, detect the status information of the user terminal.

According to one embodiment of the present invention, the input/output interface 406 may control the user input received from the user input receiving module 402 and the device status information acquired from the sensor module 404 to be used in other modules in the interactive agent system 400. According to one embodiment of the present invention, the input/output interface 406 may control conversation responses generated by other modules in the interactive agent system 400 to be provided to the response output module 416 described below.

According to one embodiment of the present invention, for example, when a voice input is received from the outside, the voice recognition/input interpretation module 408 may process and recognize the voice input and interpret the voice input according to a predetermined model. According to one embodiment of the present invention, when a text input is received from the outside, the voice recognition/input interpretation module 408 may also interpret the text input according to a predetermined model. According to one embodiment of the present invention, the result of the interpretation of the user input by the voice recognition/input interpretation module 408 may include, for example, determination of user intent or generation of a query associated with a predetermined conversation response and/or execution of a specific task.

According to one embodiment of the present invention, the user database 410 may be a database that stores and manages user-specific characteristic data. According to one embodiment of the present invention, the user database 410 may include, for example, the record of user's previous conversation, user's pronunciation feature information, user vocabulary preference, user's location, setting language, contact/friend list, and other various types of user characteristic information for each user. According to one embodiment of the present invention, the user database 410 may include user characteristic information obtained from each user's record of previous conversation, including, for example, the frequency of use of an interjection by a user, the type of interjection frequently used, the type of interjection or other common-use phrases used according to the mood or emotional status in a conversation, and the like. According to one embodiment of the present invention, the voice recognition/input interpretation module 408 may perform an operation necessary for voice recognition or interpretation of the user input by referring to the user database 410.

According to one embodiment of the present invention, the vocabulary 412 may be a predetermined lexical database that includes vocabularies, abbreviations, buzzwords, non-standard words, etc. assigned to each persona of the interactive agent system, such as a gender, an age group, a region of origin, and a set personality. According to one embodiment of the present invention, the vocabulary 412 may be continuously updated to reflect trends or issues of the time.

According to one embodiment of the present invention, the task executing/task providing module 414 may perform a procedure for performing a specific task and/or providing a conversation response corresponding to the user input, based on user intent and/or a query from the voice recognition/input interpretation module 408. According to one embodiment of the present invention, the task executing/response providing module 414 may determine whether sufficient information to perform a task or provide a conversation response corresponding to the user intent is acquired by the query without, for example, additional information, and, when it is determined that the sufficient information is acquired, perform a procedure for performing a task and providing a response that matches the query, that is, the user input. According to one embodiment of the present invention, in relation to providing a conversation response that matches the user input, the task executing/response providing module 414 may determine, according to a predetermined criterion, whether a substantial reply needs to be provided, and, when it is determined that the substantial reply needs to be provided, the task executing/response providing module 414 may generate an appropriate substantial reply by referring to the user database 410 and the vocabulary 412. According to one embodiment of the present invention, in relation to providing the conversation response that matches the user input, when, for example, it is determined that the substantial reply does not need to be provided, the task executing/response providing module 414 may determine whether an interjection needs to be provided, and when the interjection is determined to need to be provided, the task executing/response providing module 414 may select an appropriate interjection by referring to the user database 410 and the vocabulary 412.

According to one embodiment of the present invention, when it is determined that the sufficient information to perform a task or provide a conversation response corresponding to the user input is not acquired by the query, the task executing/response providing module 414 may wait for an additional user input for a predetermined period of time or ask an additional question to obtain lacking information. According to one embodiment of the present invention, the task executing/response providing module 414 may refer to the user database 410 and the vocabulary 412 when generating a conversation response, for example, a substantial reply, selecting an interjection, selecting an additional question, and the like.

According to one embodiment of the present invention, the response output module 416 may output a response corresponding to the user input in various forms, such as visual, auditory, and/or tactile forms. According to one embodiment of the present invention, the response output module 416 may include, for example, various types of display devices, and provide the user with visual responses, for example, text, symbols, videos, images, hyperlinks, animation, various notifications, and the like, corresponding to the user input, through the display devices. According to one embodiment of the present invention, the response output module 416 may include, for example, a speaker or a headset, and provide the user with an auditory response, for example, a voice and/or sound response, corresponding to the user input, through the speaker or the headset. According to one embodiment of the present invention, the response output module 416 may include a motion/haptic feedback generation unit, and provide a tactile response, for example, a motion/haptic feedback, to the user through the motion/haptic feedback unit. According to one embodiment of the present invention, the response output module 416 may simultaneously provide a combination of any two or more of a text response, a voice response, and a motion/haptic feedback corresponding to the user input.

Figure 5:
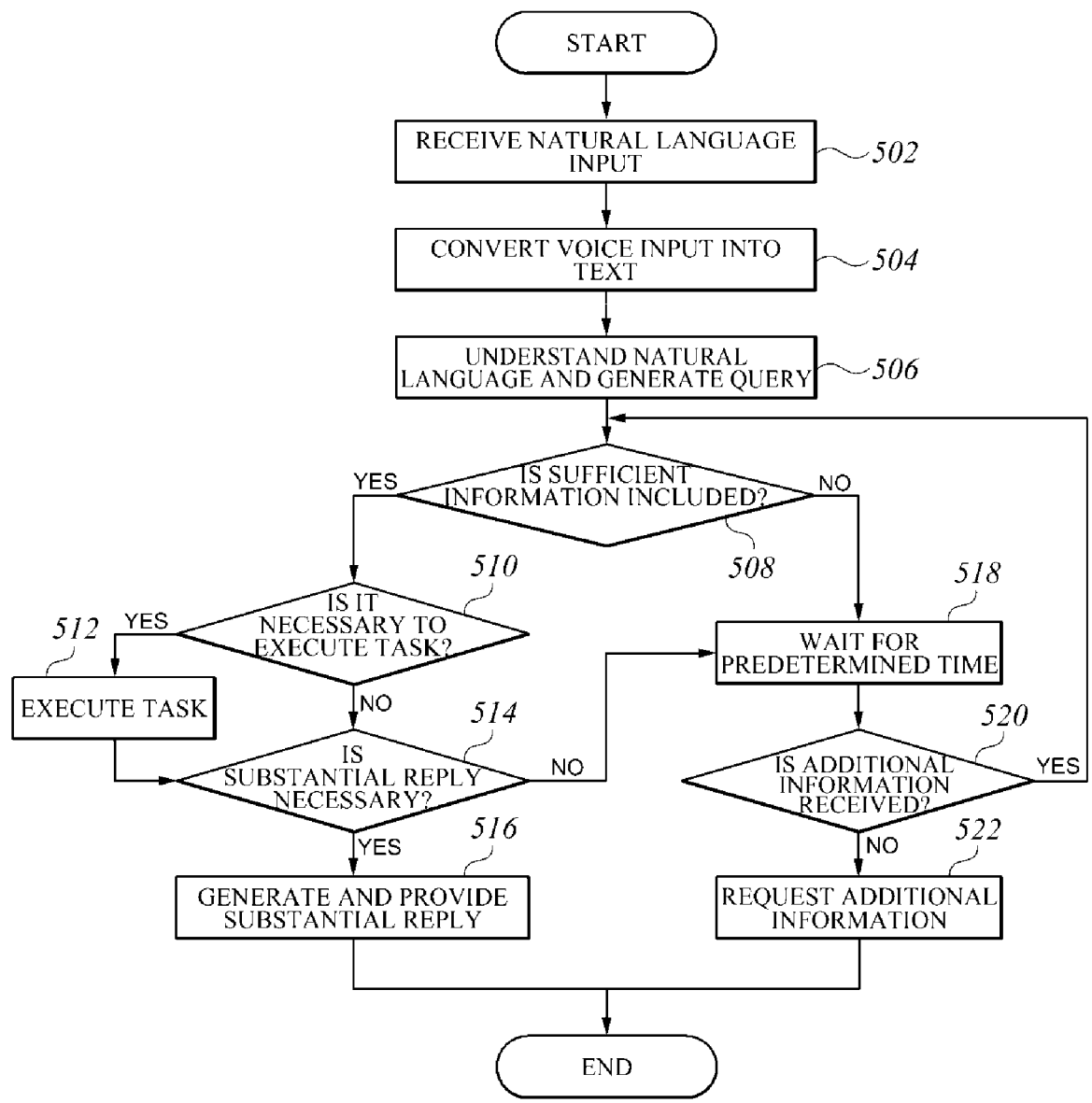
FIG. 5 is a flowchart illustrating an exemplary operation flow performed by an interactive agent system, according to one embodiment of the present invention.

FIG. 5 is a flowchart illustrating an exemplary operation flow performed by an interactive agent system according to one embodiment of the present invention.

In step 502, the interactive agent system may receive a user input including a natural language input composed of one or more words. According to one embodiment of the present invention, the natural language input may be a voice input received through, for example, a microphone. According to another embodiment of the present invention, the natural language input may be a text input received through a keyboard, a touchpad, or the like.

In step 504, a voice input included in the user input received in step 502 may be converted into text. If the user input received in step 502 is not the voice input, but a text input, step 503 may be skipped. Thereafter, in step 506, natural language understanding/processing may be performed on the text received from the user or obtained by converting the voice input received from the user, thereby determining user intent corresponding thereto. The conversion of the voice input into text, the natural language understanding/processing, and the determination of user intent corresponding thereto have been described above, and detailed descriptions thereof will be omitted.

In step 508, it may be determined whether all sufficient information to perform a task or provide a conversation response corresponding to the user intent is acquired without having to request additional information. According to one embodiment of the present invention, for example, a generated query may be related to a delivery order (e.g., a query for ordering two chickens), and when, in step 508, it is determined that all sufficient information necessary for the query (e.g., information necessary for the delivery order, such as product name, address, quantity, and the like) has been obtained from the user input, the procedure may proceed to step 510 and it is determined whether the corresponding query requires performing a specific task. In step 510, when it is determined that the execution of a specific task (e.g., delivery acceptance request) is required, the procedure may proceed to step 512 and the execution of the specific task may be completed. After the execution of the specific task is completed in step 512, or when it is determined in step 510 that the execution of the specific task is not required, the procedure may proceed to step 514.

In step 514, according to a predetermined criterion, it may be determined whether a substantial reply needs to be provided to the user. According to one embodiment of the present invention, the substantial reply may be a reply with the substantial content that notifies of the completion of executing the specific task that matches the user intent (e.g., "the requested task has been completed," and the like), provides new content acquired based on the user's intent to indicate that the user's intent has been understood, or includes meaningful information (e.g., substantial data content and the like) that matches the user's intent.

According to one embodiment of the present invention, it may be determined whether the substantial reply needs to be provided depending on, for example, the type of a sentence related to the input query. For example, in the case of an interrogative sentence, such as "What is your name?" or an imperative sentence, such as "Tell me the weather today," a substantial reply (e.g., "My name is OOO," "Today's weather is clear, windy, and low humidity," or the like) may be generally provided. For example, if a task of chicken delivery is performed, a substantial reply that notifies of the completion of executing the task (e.g., "the chicken delivery ordering has been completed" and the like) may be provided. In addition, if the sentence related to the input query is based on the content of a previous conversation, for example, "the late-night snack I had last night was so good," the interactive agent system needs to provide a substantial reply to indicate that the user's intent was understood, by providing new content (i.e., new content that was not directly contained in the user's input), such as "Was the crust pizza so delicious?" by referring to the content of the corresponding previous conversation. According to one embodiment of the present invention, when the sentence related to the input query contains a specific common-use phrase (for example when a specific phrase such as "The weather is good," "It's cold," etc. that needs an appropriate response is contained, or when a specific phrase such as "I'm going to bed now," "See you later," "thanks today," etc. that requires confirming whether the conversation ends is contained), it may be necessary to provide a reply with a common-use phrase (e.g., "The weather is really nice," "It's really cold," or "Good night," "See you soon," "Talk to me soon," etc.) that corresponds to the specific phrase. According to another embodiment of the present invention, when it is determined that the sentence related to the input query is aimed to finish the current conversation, it may necessary to provide a substantial reply (e.g., "Do you need anything else?", "Are you done now?", or the like) for confirming the intention to finish the conversation. According to one embodiment of the present invention, whether or not the sentence related to the input query is intended to finish the current conversation may be determined based on neural network learning.

Meanwhile, when the sentence related to the input query is a simple statement, for example, "I didn't sleep well last night" or "My name is ooo" or a simple exclamatory sentence, for example, "Ah, nice," generally, an immediate substantial reply may not need to be provided. Here, it should be understood that the above-described conditions for determining whether the substantial reply needs to be provided to the user are merely examples and various criteria may be considered. When it is determined in step 514 that the substantial reply needs to be provided, the interactive agent system may generate a substantial reply and provides the generated substantial reply to the user terminal 102 in step 516.

When it is determined in step 514 that the substantial reply does not need to be provided, the procedure may proceed to step 518. According to one embodiment of the present invention, the interactive agent system may wait for additional information to be input for a predetermined period of time.

Returning to step 508, when it is determined that the necessary information for the query that corresponds to the user intent has not yet been obtained, the procedure may proceed to step 518 and the interactive agent system may wait for an additional input for a predetermined period of time. According to one embodiment of the present invention, for example, when the generated query is related to a delivery order, an input sentence related to the query simply ends with "I want to order chicken" and does not contain information necessary for delivery order, for example, product name, address, quantity, and the like, it may be determined that sufficient information is not contained. In step 520, it may be determined whether additional information is input from the user, and when the additional information is input, the procedure may return to step 508. On the contrary, when it is determined in step 524 that the additional information has not yet been input from the user, the procedure may proceed to step 522 and the interactive agent system may select an appropriate sentence for a question or request for information for obtaining the additional information and provide the selected sentence to the user terminal 102. According to one embodiment of the present invention, as described above, when no additional information has been input until a predetermined time has elapsed after simply the input of "I want to order chicken" was received, the interactive agent system may generate an additional question, for example, "What chicken will you order?", and provide the additional question to the user terminal 102. On the contrary, when additional information, such as "Please send two chickens from Kyochon to my house," is input before the predetermined period of time has elapsed after the input of "I want to order chicken," the procedure may proceed to step 508 and the subsequent procedures will be performed.

Figure 6:
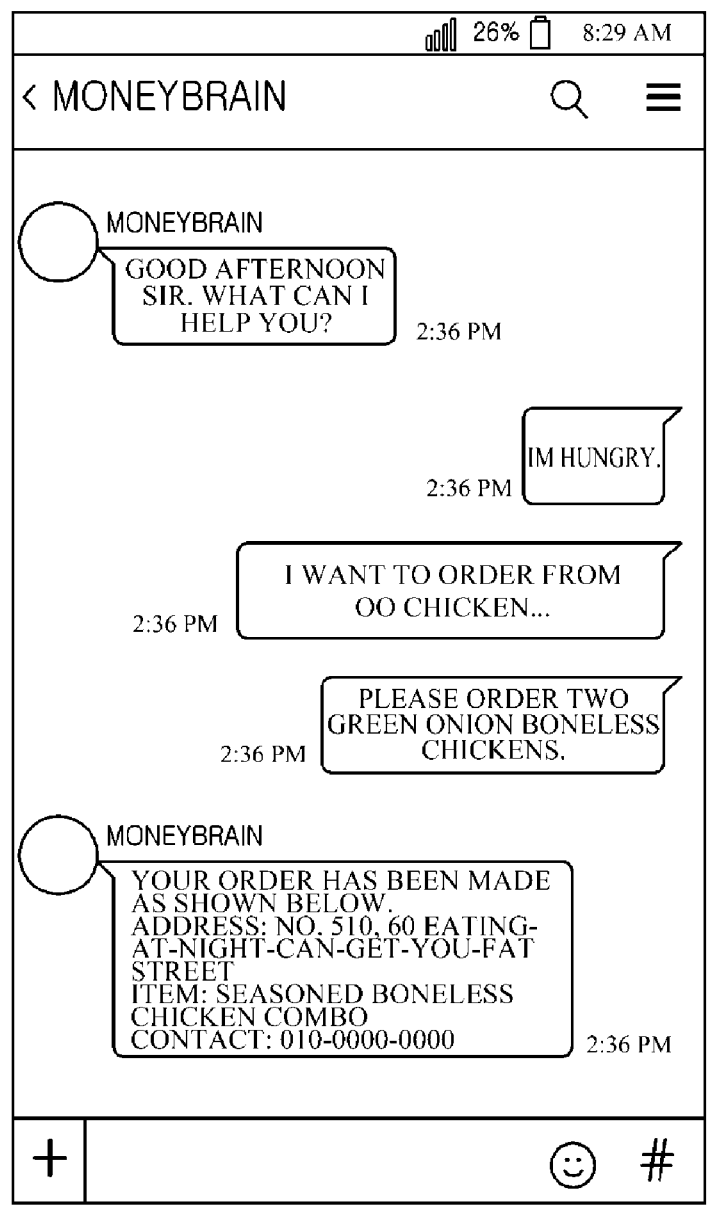
FIG. 6 is a diagram illustrating an example of a conversation between a user and an interactive agent system according to one embodiment of the present invention.

FIG. 6 is a diagram illustrating an example of a conversation between a user and an interactive agent system according to one embodiment of the present invention. It should be noted that the illustrated conversation is included only to describe one embodiment of the present invention and the present invention is by no means limited by such examples.

As illustrated, it can be seen that a simple statement, "I'm hungry" is received from a user. According to one embodiment of the present invention, in this case, the interactive agent system may determine that there is no need to provide a substantial reply. Therefore, as shown in FIG. 6, it can be seen that the interactive agent system waits for a predetermined period of time without responding at this point.

As illustrated in FIG. 6, it can be seen that after a certain period of time has elapsed, an input of "I want to order from OO Chicken" is received from the user again. According to one embodiment of the present invention, the interactive agent system may determine that the corresponding input does not contain sufficient information (e.g., an item to be ordered or the like), and wait again without responding. Then, an input of "Please order two green onion boneless chickens" is additionally received from the user within a predetermined period of time. According to one embodiment of the present invention, the interactive agent system may determine that sufficient information has been obtained this time from the corresponding input, complete a given task (e.g., delivery order), and then provide a substantial reply regarding the completion of the task, for example, "Your order has been made as shown below."

It will be understood that the present invention is not limited to the examples given hereinabove, and that various changes, substitutions, and alternations may be made herein without departing from the scope of the invention. It will be understood that the units and/or modules described herein may be implemented using hardware components, software components, and/or combination of the hardware components and the software components.

A computer program according to one embodiment of the present invention may be implemented as being stored in various types of computer-readable storage media. The storage media readable by a computer processor or the like include, for example, volatile media such as EPROM, EEPROM, and a flash memory device, a magnetic disk, such as a built-in hard disk and a detachable disk, a magneto-optical disk, and a CDROM disk. Further, program code(s) may be implemented in machine language or assembly language. It is intended in the appended claims to cover all changes and modifications that follow in the true spirit and scope of the invention.

The invention claimed is:

1. A method for providing a natural language conversation, which is implemented by an interactive agent system, the method comprising:

receiving a natural language input;
determining a user intent based on the natural language input by processing the natural language input, wherein the determined user intent is associated with at least one of execution of a specific task, provision of specific information, and a simple statement; and
providing a natural language response corresponding to the natural language input, based on at least one of the natural language input and the determined user intent, the providing of the natural language response comprising:

determining whether a predetermined first condition is satisfied, wherein whether or not the first condition is satisfied is determined based on whether it is possible to obtain all sufficient information from the natural language input for the execution of the specific task, the provision of the specific information, or the simple statement that is associated with the determined user intent, without having to request additional information; and when the first condition is satisfied, determining whether a predetermined second condition is satisfied and providing a natural language response belonging to a category of substantial replies when the second condition is satisfied;

when the natural language input does not satisfy the first condition, intentionally waiting for additional information to be input without processing for providing a natural language response, and starting a process for providing a natural language response for requesting the additional information after a preset period of time when the additional information is not input until the preset period of time has elapsed, and not providing a natural response for requesting the additional information when the additional information is input before the preset period of time has elapsed; and when the natural language input does not satisfy the second condition, intentionally waiting for additional information to be input without processing for providing a natural language response, and starting a process for providing a natural language response for requesting the additional information after a preset period of time when the additional information is not input until the preset period of time has elapsed, and not providing the natural response for requesting the additional information when the additional information is input before the preset period of time has elapsed.

2. The method of claim 1, wherein whether or not the second condition is satisfied is determined based on at least one of whether the determined user intent is associated with the execution of the specific task or the provision of the specific information, what type of sentence is in the natural language input, whether the natural language input is based on a record of previous conversation, and whether the natural language input contains a predetermined common-use phrase.

3. The method of claim 2, wherein, when the type of the sentence in the natural language input is an interrogative sentence or an imperative sentence, it is determined that the second condition is satisfied.

4. The method of claim 2, wherein, when the natural language input is based on a record of previous conversation, it is determined that the second condition is satisfied, and wherein the method comprises when the second condition is satisfied, providing a natural language response that is generated based on the record of previous conversation and belongs to the category of the substantial replies.

5. The method of claim 2, wherein, when the natural language input contains a predetermined common-use phrase, it is determined that the second condition is satisfied, and wherein the method comprises when the second condition is satisfied, providing a natural language response that is predetermined corresponding to the predetermined common-use phrase and belongs to the category of the substantial replies.

6. The method of claim 1, wherein whether or not the second condition is satisfied is determined by determining, based on neural network learning, whether the natural language input is intended to finish a conversation.

7. The method of claim 2, wherein, when the determined user intent is associated with the execution of the specific task or the provision of the specific information, it is determined that the second condition is satisfied, and wherein the method comprises when the second condition is satisfied, completing the execution of the specific task or search for the specific information, and then providing a natural language response belonging to the category of the substantial replies, wherein the natural language response notifies of the completion of the execution of the specific task or include at least part of the specific information.

8. A non-transitory computer-readable recording medium having one or more instructions stored thereon which, when executed by a computer, cause the computer to perform the method of one of claim 1.

9. A computer device configured to provide a natural language conversation, the computer device comprising:
   a user input receiving module configured to receive a natural language input;
   an input interpretation module configured to determine a user input based on the natural language input by processing the natural language input; and
   a response providing module configured to provide a natural language response corresponding to the natural language input, based on at least one of the natural language input and the determined user intent,
   wherein the determined user intent is associated with at least one of execution of a specific task, provision of specific information, and a simple statement, and
   wherein the response providing module is further configured to determine whether a predetermined first condition is satisfied, wherein whether or not the first condition is satisfied is determined based on whether it is possible to obtain all sufficient information from the natural language input for the execution of the specific task, the provision of the specific information, or the simple statement that is associated with the determined user intent, without having to request additional information, and, when the first condition is satisfied, determine whether a predetermined second condition is satisfied, and provide a natural language response belonging to a category of substantial replies when the second condition is satisfied Wherein the response providing module is further configured to:

when the natural language input does not satisfy the first condition, intentionally wait for additional information to be input without processing for providing a natural language response, and start a process for providing a natural language response for requesting the additional information after a preset period of time when the additional information is not input until the preset period of time has elapsed, and not provide the natural response for requesting the additional information when the additional information is input before the preset period of time has elapsed; and the response providing module is further configured to, when the natural language input does not satisfy the second condition, intentionally wait for additional information to be input without processing for providing a natural language response, and start a process of providing a natural language response for requesting the additional information after a preset period of time when the additional information is not input until the preset period of time has elapsed, and not provide the natural response for requesting the additional information when the additional information is input before the preset period of time has elapsed.

10. The computer device of claim 9, comprising a user terminal or a server communicably coupled to the user terminal.

* * * * *